April 29, 1924.

T. T. PLUMMER

COMBINED FENDER BRACE AND BUMPER

Filed July 6, 1923

2 Sheets-Sheet 1

INVENTOR
T. T. Plummer.
BY
Van Buren Hillyard.
ATTORNEY

WITNESSES

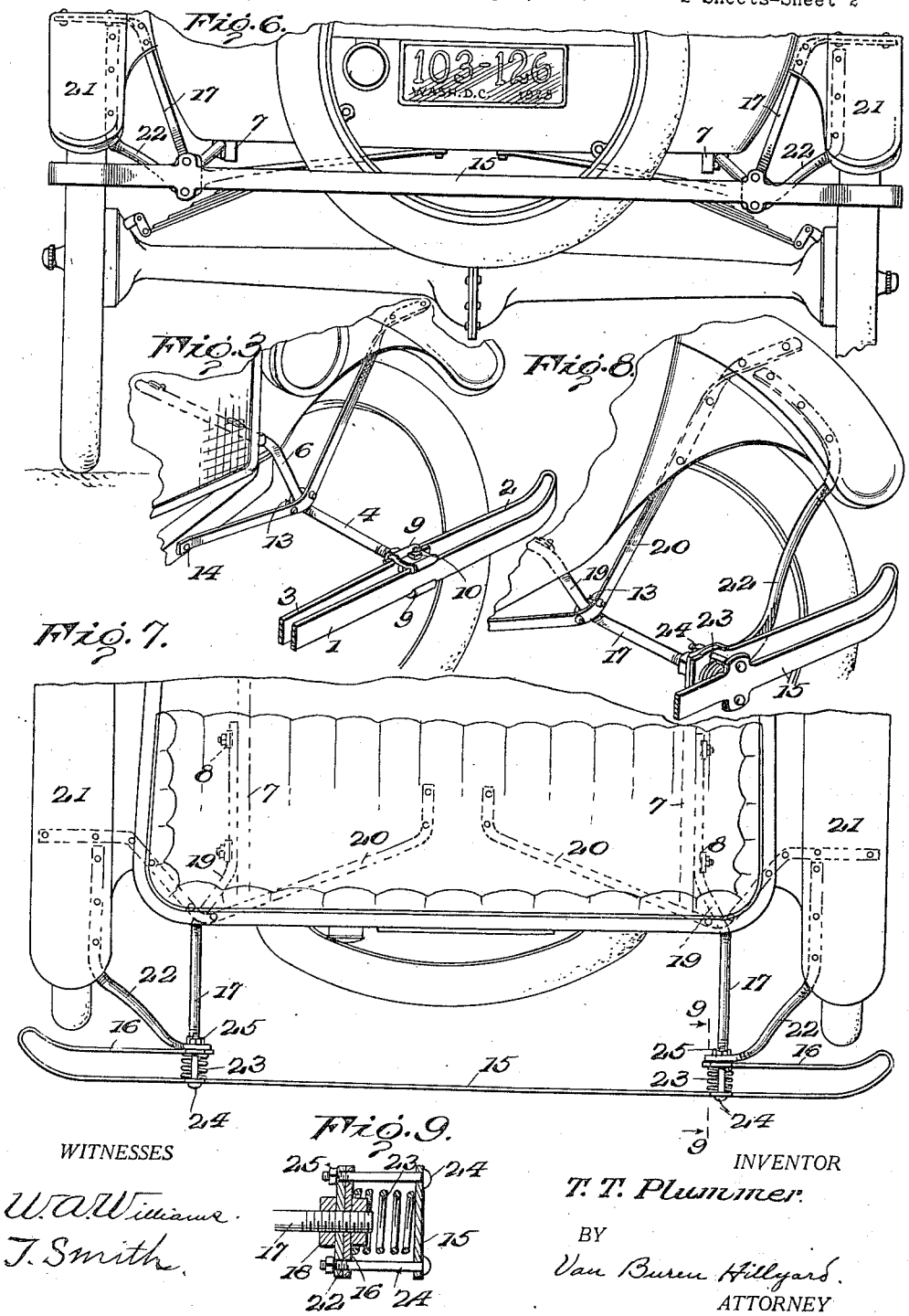

Patented Apr. 29, 1924.

1,492,045

UNITED STATES PATENT OFFICE.

THOMAS T. PLUMMER, OF WICHITA FALLS, TEXAS, ASSIGNOR TO DIXIE MANUFACTURING COMPANY, OF WICHITA FALLS, TEXAS, A CORPORATION OF ARIZONA.

COMBINED FENDER BRACE AND BUMPER.

Application filed July 6, 1923. Serial No. 649,866.

*To all whom it may concern:*

Be it known that I, THOMAS T. PLUMMER, a citizen of the United States, residing at Wichita Falls, in the county of Wichita and State of Texas, have invented certain new and useful Improvements in Combined Fender Braces and Bumpers, of which the following is a specification.

The present invention relates to protective means for motor vehicles, such as automobiles and trucks, and has for its object to brace the fenders and bumpers and support the latter in a manner to prevent rattle and undue vibration and yet admit of the same yielding by direct impact to neutralize shock and function under certain conditions as a wheel brake.

A further object of the invention is to support the wheel fenders and prevent vibration, loose joints and displacement thereof, thereby obviating chatter, play and a sagging of the parts.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Figure 1:
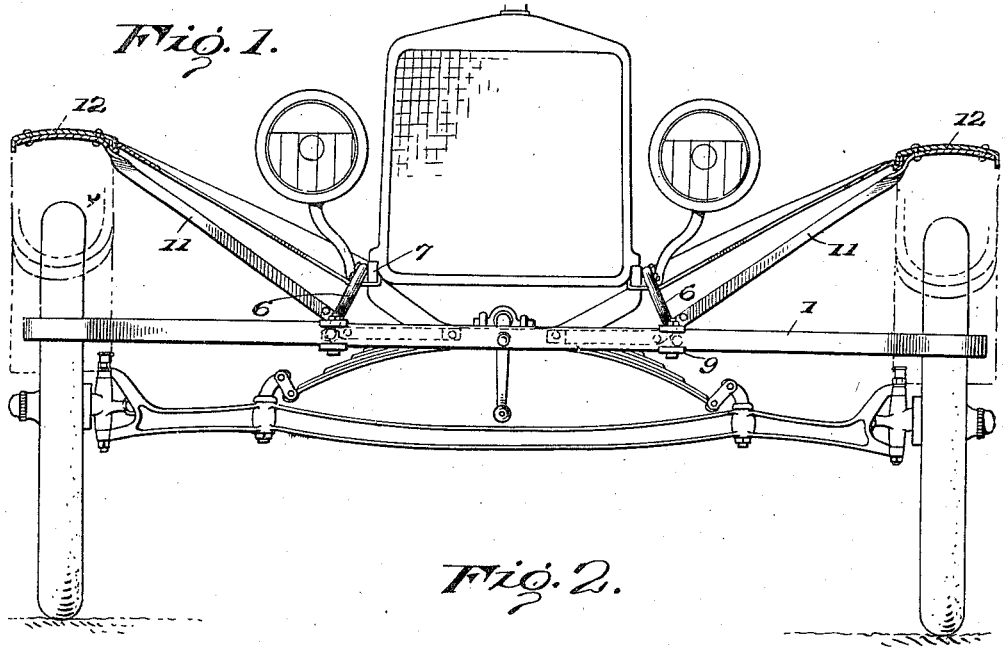
Figure 2:
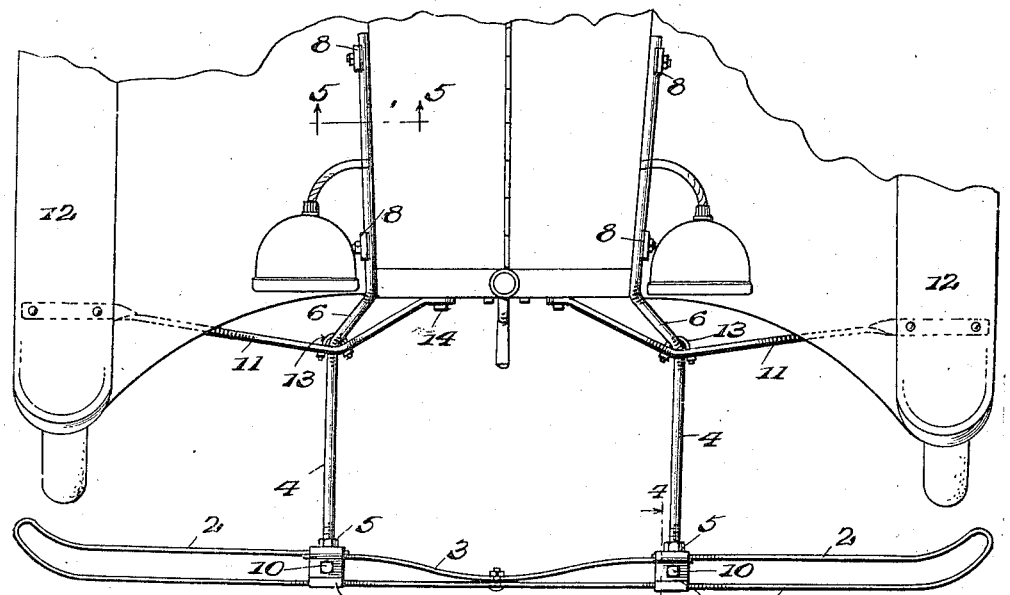
Figure 4:
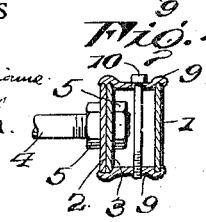
Figure 5:
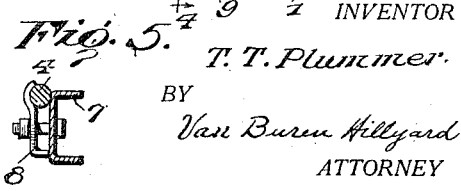

Referring to the accompanying drawings forming a part of the application:

Figure 1 is a front view of an automobile showing the application of the invention, Figure 2 is a top plan view, Figure 3 is a detail perspective view, Figure 4 is a sectional detail view on the line 4—4 of Figure 2, Figure 5 is a detail sectional view on the line 5—5 of Figure 2, Figure 6 is a rear view of the vehicle showing the rear bumper and fenders braced and supported in accordance with the invention, Figure 7 is a top plan view of the parts shown in Figure 6, Figure 8 is a detail view showing more clearly the bracing connection, and Figure 9 is a detail sectional view on the line 9—9 of Figure 7.

The invention is designed alike for pleasure cars and motor trucks and is of such construction as to be readily applied to vehicles in service without requiring any change in the construction or arrangement of parts. The numeral 1 designates the front fender which, as shown, comprises a flat bar of spring metal having its opposite end portions rebent, as indicated at 2, and spaced from the main portion of the bar. A supplemental bar 3 is attached midway of its ends to the main bar 1 and its end portions are spaced gradually from the main bar 1 and have their terminal portions overlapping the extremities of the bent ends 2, the overlapping end portions being pierced to receive the threaded ends of longitudinally disposed rods 4, and which threaded ends are provided with a pair of nuts 5 between which the overlapping ends of the elements 2 and 3 are clamped, as indicated most clearly in Figure 4. The longitudinal rods 4 are offset intermediate their ends, as indicated at 6, and their inner or rear ends are secured to the longitudinal bars 7 of the chassis in any preferred way, as by means of clips 8 shown most clearly in Figure 5. Glands or yokes 9 engage the upper and the lower edges of the parts 1, 2 and 3 and are clamped thereto by means of a bolt 10. The outer ends of the fender extend beyond the front wheels and are rearwardly curved and are spaced a short distance therefrom. As a result of this arrangement, impact of the ends of the fender with an object will deflect and bring the ends of the fender in contact with the wheels and thereby operate as a brake to assist materially in bringing the vehicle to a quick stop.

Transversely disposed rods 11 have their inner ends disposed horizontally and their outer ends upwardly and outwardly inclined and attached to the front wheel fenders 12. The intermediate portion of the rods 11 is deflected outwardly, as indicated most clearly in Figure 2, and is made fast to the longitudinal rod 4 in advance of the offset portion 6. A clip or shackle 13 connects the parts 4 and 11 at the point of crossing. The outer ends of the transverse rods 11 conform to the fenders and are bolted or otherwise secured to the underside thereof so as not to detract from the appearance. The inner ends of the transverse rods 11 are bolted or otherwise secured to the front cross member of the chassis at 14. The arrangement is such that the rods or members 4 and 11 mutually brace each other and by having portions deflected, they operate by a truss brace action.

The rear fender is constructed in substantially a like manner to the front fender and comprises a main bar 15 and inwardly bent end portions 16. Longitudinal rods 17 have their outer ends threaded and passed through openings in the bent ends 16 and provided with a pair of nuts 18 between which the parts 16 are clamped. The longitudinal rods 17 are offset intermediate their ends, as indicated at 19, and their inner or rear ends are secured to the longitudinal bars 7 of the chassis by clips 8 or in any other preferred way. Transverse rods 20 have their inner ends secured to the rear crosspiece of the chassis and their outer ends attached to the rear wheel fenders 21. The transverse rods 20 are deflected rearwardly and downwardly intermediate their ends and are secured to the longitudinal rods 17 in the rear of the offset portions 19, said connection being effected at the point of crossing of the rods by means of clips 13 or other preferred fastening means. Other rods 22 have their outer forward ends overlapping the rear ends of the fenders 21 and bolted or otherwise secured thereto and their inner rear ends are connected to the bent ends 16 of the rear fender by means of the longitudinal rods 17 and the clamp nuts 18. An expansible helical spring 23 is interposed between each bent end 16 and the main portion of the bumper 15 and assists materially in sustaining any shock incident to impact of an object with the bumper. Bolts 24 pass through registering openings formed in the parts 15, 16 and 22.

What is claimed is:

1. In a vehicle provided with opposed wheel fenders and a bumper, transverse rods secured at their inner ends to the vehicle and at their outer ends to the fenders and deflected intermediate their ends towards the bumper to form truss braces, and longitudinally disposed rods connecting the bumper to the vehicle and offset adjacent the vehicle and attached to the transverse rods, whereby to coact therewith to mutually brace one another and support the bumper and fenders.

2. In a vehicle provided with opposed wheel fenders and a bumper, longitudinal rods connecting the bumper to the vehicle and offset adjacent the latter, and transverse rods secured intermediate their ends to the longitudinal rods adjacent and outwardly from the offset portions thereof and having their inner ends deflected away from the bumper and towards the vehicle and attached to the latter, and having their outer ends deflected upwardly and away from the bumper and attached to the fenders, the two sets of rods mutually bracing one another and supporting and bracing the bumper and fenders.

3. In combination, opposite wheel fenders, a bumper disposed transversely of the vehicle at a point beyond the fenders and having its end portions recurved, a yieldable connection between the recurved ends and the main portion of the bumper, rods attached at their inner ends to the vehicle and at their outer ends to the recurved ends of the bumper, and other rods attached to the fenders and to the outer ends of the before mentioned rods and the recurved ends of the bumper.

4. In combination, opposite wheel fenders, a bumper disposed transversely of the vehicle beyond the fenders, longitudinal bars between the vehicle and ends of the bumper, transverse rods between the vehicle and fenders and crossing the longitudinal bars, means connecting the rods at the point of crossing, and other rods between the fenders and bumper and having connection with the outer ends of the longitudinal rods.

In testimony whereof I affix my signature.

THOMAS T. PLUMMER.